Sept. 3, 1957     H. C. PAULSEN     2,804,871
ROD CEMENT HANDLING APPARATUS
Filed July 31, 1956
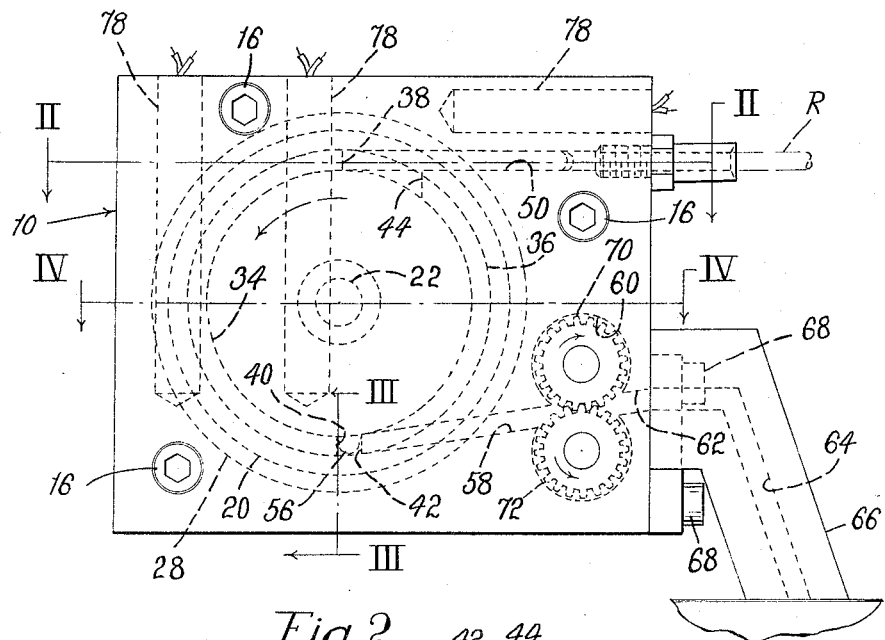
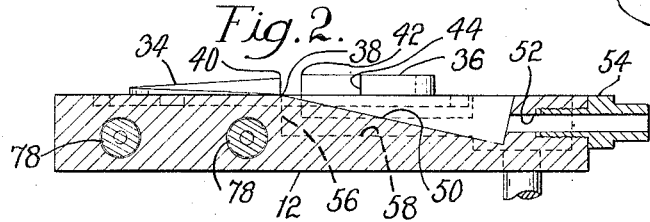
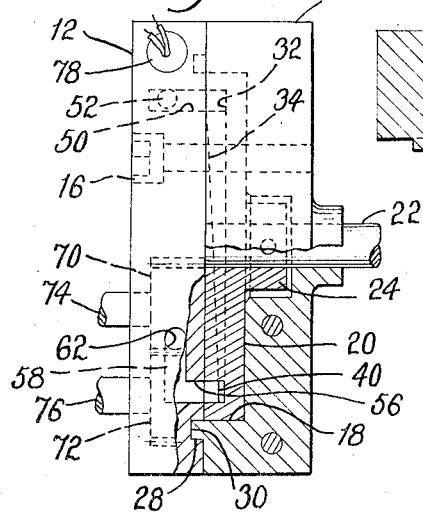
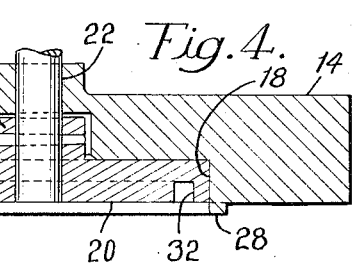
Inventor
Hans C. Paulsen
By his Attorney United States Patent Office 2,804,871
Patented Sept. 3, 1957

2,804,871

ROD CEMENT HANDLING APPARATUS

Hans C. Paulsen, Lexington, Mass., assignor to United Shoe Machinery Corporation, Boston, Mass., a corporation of New Jersey Application July 31, 1956, Serial No. 601,165

8 Claims. (Cl. 126—343.5)

This invention relates to apparatus for handling rod cement and is particularly concerned with improvements in apparatus of this type wherein the rod cement is fed along and is at the same time melted by means of a rotating disk or disk-like member journaled within a heated casing, for example of the type disclosed and claimed in application for United States Letters Patent Serial No. 329,810, filed January 6, 1953, now Patent No. 2,765,768, granted October 9, 1956, in my name.

In use of the apparatus of the above-mentioned type it has been found that the melting and feeding disk has a definite tendency to draw the cement along through the passage formed between the disk and the casing as the cement is progressively melted so that the disk or disk-like member actually has what may be termed a "pumping action." It is the object of the present invention to provide a novel and improved cement handling apparatus of the aforementioned type wherein the pumping action of the rotatable disk-like member is augmented and the melting of the cement as it is fed along is facilitated. To this end, the herein illustrated apparatus has a heated casing in which there is journaled a disk provided on one of its side faces with an annular groove into which there projects a rib to form with the groove a passageway which leads from an inlet in the casing to an outlet in the casing. Preferably, and as herein illustrated, the rib is of increasing height from the inlet to the outlet so that a passage of decreasing cross sectional area is provided. Also projecting into the groove in the disk is another rib of substantially the same height as the depth of the groove, the opposite ends of this rib serving as barriers for limiting the extent of the aforementioned passageway from a point in the vicinity of the inlet in the casing around to a point just beyond the outlet in the casing. With this novel and improved arrangement, the two sides and bottom of the groove in the disk present moving surfaces of the cement introduced into the passageway through the inlet in the casing and thus augment the feeding, or "pumping" action of the disk. Moreover, these three surfaces present an increased area of contact of the heated disk with the cement and thereby facilitate the melting of the cement by the transfer of heat from the disk thereto as the cement is being fed along the passageway.

The above and other objects and features of the invention will be apparent from the following detail description of the preferred embodiment which is illustrated in the accompanying drawings, and will be pointed out in the claims.

In the drawings,

Fig. 1 is a view in side elevation of a cement handling apparatus embodying the features of the invention;

Fig. 2 is a view in section, substantially on line II—II of Fig. 1 and looking in the direction of the arrows, of the apapratus shown in Fig. 1;

Fig. 3 is a view in end elevation of the apparatus shown in Fig. 1 with a portion thereof broken away and with certain parts omitted and others shown in vertical section substantially on line III—III of Fig. 1 and looking in the direction of the arrows; and Fig. 4 is a view in horizontal section substantially on line IV—IV of Fig. 1 and looking in the direction of the arrows, of a portion of the apparatus.

Referring to these drawings, the improved cement handling apparatus therein illustrated comprises a casing indicated generally by the reference character 10 and formed of two separate members 12 and 14 which are secured together in assembled relation by means of screws 16, 16. The member 14 is provided with a cylindrical recess 18 for receiving a disk 20 which is rotatable within the recess by means of a shaft 22, journaled in the member 14, to which a hub portion 24 of the disk is secured by means of a pin 26, Fig. 4. Adjacent to the recess 18, the member 14 is provided with an annular rib 28 which is adapted to fit snugly within a matching annular groove 30 formed in the other casing member 12 when the two casing members are secured together, Fig. 3.

The disk 20 has on one of its side faces an annular groove 32 of generally square cross-sectional shape, as shown in Fig. 4, and concentric with the axis of the shaft 22. Formed integrally with the casing member 12, and extending from one side thereof into the groove 32 on the disk 20, when the two casing members are assembled together, are two arcuate ribs 34 and 36. As shown in Fig. 2, the rib 34 has one end 38 substantially flush with the side face of the member 12 and increases in height from this end around to its other end 40, while the rib 36 is of the same height from one end 42 to its other end 44, the height of this rib being substantially equal to the depth of the groove 32 in the disk 20. Thus, when the parts are assembled, a passageway of decreasing lateral width is provided in the disk and leading from the end 38 of the rib 34 around, approximately 180°, to the end 40 of this rib, the height of the rib 34 at the end 40 thereof being somewhat less than the depth of the groove 32, see Fig. 3, so that a restricted passageway is provided leading into the space between the end 40 of the rib 34 and the end 42 of the rib 36.

The casing member 12 is cut away to provide a groove 50 which extends at one end to the side face of this member adjacent to the end 38 of the rib 34, Fig. 2, and leading into this groove is a bore 52 in which there is mounted a guide bushing 54. Extending laterally from the space between the ends 40, 42 of ribs 34, 36 is a bore 56 which is connected to a bore 58 leading into a pump chamber 60 formed in the member 12, Fig. 1. Leading from this chamber is an outlet bore 62 in communication with a discharge passage 64 formed in a nozzle 66 which is secured to the casing by means of screws 68. Located within the pump chamber 60 are two meshing gears 70, 72, mounted on shafts 74, 76 which are journaled in the casing member 12, Fig. 3. Fitted within bores in the casing members 12 and 14 are several electrical heating units 78, 78, Figs. 1, 2 and 3, which are connected to a suitable source of electrical energy (not shown).

In use, the disk 20 is rotated in the direction of the arrow, Fig. 1, and the gears 70, 72 to the pump are driven in the direction of the arrows, Fig. 1, by any suitable mechanism, not shown, and the leading end of a rod of cement R is fed through the guide bushing 54 and into the inlet passage provided by the groove 50 in any suitable manner, for example, by mechanism of the type disclosed in United States Letters Patent No. 2,726,629, granted December 13, 1955, on an application filed in my name. As the solid rod of cement enters the large end of the passageway, provided by the groove 32 in the disk 20 and the rib 34, it is gradually melted as it is dragged along by the moving surfaces of the sides and bottom of the groove 32 and the melting rod is gradually squeezed and worked as it approaches the smaller end of this passageway adjacent to the end 40 of the rib 34. Thus, by the time the cement reaches and is moved through the restricted portion of the passageway adjacent to the end 40 of the rib 34 and into the space between the end 40 of the rib 34 and the end 42 of the rib 36, it is completely melted. This molten cement is forced into the bore 56 which, in effect, serves as an outlet from the melting chamber, and thence through the bore 58 into the pump chamber 60 from which molten cement is delivered by the pump gears 70, 72 to the nozzle 66 through the bore 62.

Having thus described my invention, what I claim as new and desire to secure by Letters Patent of the United States is:

1. A cement handling apparatus comprising a heated casing including a pair of casing members secured together in face-to-face relation and provided with an inlet and an outlet, one of said members being provided with a circular recess, and a disk journaled in the casing and rotatable within said recess, said disk having an annular groove therein, and the other of said casing members having an arcuate rib projecting into the groove in said disk to provide a passageway leading from the inlet to the outlet in said casing.

2. A cement handling apparatus comprising a heated casing including a pair of casing members secured together in face-to-face relation and provided with an inlet and an outlet, one of said members being provided with a circular recess, and a disk journaled in the casing and rotatable within said recess, said disk having an annular groove formed in one of its side faces, and the other of said casing members having an arcuate rib projecting into the groove in said disk to provide a passageway leading from the inlet to the outlet in the casing.

3. A cement handling apparatus comprising a heated casing including a pair of casing members secured together in face-to-face relation and provided with an inlet and an outlet, one of said members being provided with a circular recess, and a disk journaled in the casing and rotatable within said recess, said disk having an annular groove therein, and the other of said casing members having an arcuate rib of gradually increasing height projecting into the groove in said disk to provide a passageway of gradually decreasing cross sectional area leading from the inlet to the outlet of the casing.

4. A cement handling apparatus comprising a heated casing including a pair of casing members secured together in face-to-face relation and provided with an inlet and an outlet, one of said members being provided with a circular recess, and a disk journaled in the casing and rotatable within said recess, said disk having an annular groove formed in one of its side faces, and the other of said casing members having an arcuate rib of gradually increasing height projecting into the groove in said disk to provide a passageway of gradually decreasing cross-sectional area leading from the inlet to the outlet in the casing.

5. A cement handling apparatus comprising a heated casing including a pair of casing members secured together in face-to-face relation and provided with an inlet and an outlet, one of said members being provided with a circular recess, and a disk journaled in the casing and rotatable within said recess, said disk having an annular groove therein, and the other of said casing members having a pair of arcuate ribs projecting into the groove in said disk, one of the ribs being of a height somewhat less than the depth of said groove to provide a passageway leading from the inlet to the outlet in the casing, and the other rib being of a height substantially equal to the depth of the groove to limit the extent of said passageway from a location adjacent to said inlet to a point just beyond said outlet.

6. A cement handling apparatus comprising a heated casing including a pair of casing members secured together in face-to-face relation and provided with an inlet and an outlet, one of said members being provided with a circular recess, and a disk journaled in the casing and rotatable within said recess, said disk having an annular groove formed in one of its side faces, and the other of said casing members having a pair of arcuate ribs projecting into the groove in the disk, one of the ribs being of a height somewhat less than the depth of the groove in the disk to provide a passageway leading from the inlet to the outlet in the casing, and the other rib being of a height substantially equal to the depth of the groove to limit the extent of said passageway from a location adjacent to said inlet to a point just beyond said outlet.

7. A cement handling apparatus comprising a heated casing including a pair of casing members secured together in face-to-face relation and provided with an inlet and an outlet, one of said members being provided with a circular recess, and a disk journaled in the casing and rotatable within said recess, said disk having an annular groove therein, and the other of said casing members having a pair of arcuate ribs projecting into the groove in the disk, one of the ribs being of a gradually increasing height somewhat less than the depth of the groove in the disk to provide a passageway of gradually decreasing cross-sectional area, and the other rib being of a height substantially equal to the depth of the groove to limit the extent of said passageway from a location adjacent to said inlet to a point just beyond said outlet.

8. A cement handling apparatus comprising a heated casing including a pair of casing members secured together in face-to-face relation and provided with an inlet and an outlet, one of said members being provided with a circular recess, and a disk journaled in the casing and rotatable within said recess, said disk having an annular groove formed in one of its side faces, and the other of said members having a pair of arcuate ribs projecting into the groove in said disk, one of the ribs being of a gradually increasing height somewhat less than the depth of the groove in the disk to provide a passageway, and the other rib being of a height substantially equal to the depth of the groove to limit the extent of said passageway from a location adjacent to said inlet to a point just beyond said outlet.

No references cited.